US012122625B2

(12) United States Patent
Jang et al.

(10) Patent No.: US 12,122,625 B2
(45) Date of Patent: Oct. 22, 2024

(54) MEDIUM STORAGE DEVICE AND METHOD OF CONTROLLING THE MEDIUM STORAGE DEVICE

(71) Applicant: HYOSUNG TNS INC., Seoul (KR)

(72) Inventors: Hyun Soo Jang, Seoul (KR); Jun Young Kim, Seoul (KR); Jin Yu Lim, Seoul (KR); Dahye Shin, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 312 days.

(21) Appl. No.: 17/677,166

(22) Filed: Feb. 22, 2022

(65) Prior Publication Data

US 2023/0264918 A1 Aug. 24, 2023

(51) Int. Cl.

*B65H 29/62* (2006.01)
*B65H 31/22* (2006.01)
*B65H 43/04* (2006.01)
*G07D 7/00* (2016.01)

(52) U.S. Cl.

CPC ............ *B65H 29/62* (2013.01); *B65H 31/22* (2013.01); *B65H 43/04* (2013.01); *G07D 7/00* (2013.01); *B65H 2701/1912* (2013.01)

(58) Field of Classification Search

CPC .................. B65H 29/62; B65H 31/22; B65H 2701/1912; G07D 7/00

See application file for complete search history.

(56) References Cited

U.S. PATENT DOCUMENTS

2014/0332340 A1 * 11/2014 Adachi ................. G07D 11/50 194/206

* cited by examiner

*Primary Examiner* — Howard J Sanders
(74) *Attorney, Agent, or Firm* — BACON & THOMAS, PLLC

(57) ABSTRACT

A medium storage device includes: a housing frame having, at a front portion, an entrance for replenishment and recovery to which a transit cassette is connectable, an identification unit serving to identify whether a medium is a normal medium or a rejection medium, a temporary holding unit configured to temporarily accommodate a medium, a recycle cassette configured to store the medium identified as the normal medium, a conveyance path configured to convey the medium between the identification unit, the temporary holding unit, and the recycle cassette, and a control unit configured to control the conveyance path such that the medium replenished from the transit cassette is conveyed to the temporary holding unit, the medium transferred to the temporary holding unit is conveyed to the identification unit, and the medium identified as the normal medium in the identification unit is conveyed to the recycle cassette.

10 Claims, 7 Drawing Sheets

MEDIUM STORAGE DEVICE AND METHOD OF CONTROLLING THE MEDIUM STORAGE DEVICE

TECHNICAL FIELD

The present disclosure relates to a medium storage device and a method of controlling the medium storage device.

BACKGROUND

In general, an automated teller machine is an unmanned terminal that enables the deposit and withdrawal of mediums such as cash or checks without time restriction through the use of a cash card or a passbook.

Such an automated teller machine may have a medium storage box that may store mediums such as cash or checks, and a proper amount of mediums may be stored in the medium storage box. A medium stored in the medium storage box may be taken out of the medium storage box by a customer's request for withdrawal, and a new medium may be carried into the medium storage box by a customer's request for deposit. As such, a proper amount of the mediums stored in the medium storage box need to be maintained in preparation for the customer's request for deposit or withdrawal, and it is necessary to manage and monitor whether a proper amount of mediums are stored in the medium storage box in real time.

However, when a management company for replenishing the automated teller machine with mediums is far away from the automated teller machine, it is not easy for the management company to manage the amount of mediums in the automated teller machine in real time.

For example, in the case that a specific type of banknotes are insufficient in the automated teller machine, the automated teller machine may be replenished with the specific type of banknotes through a customer's deposit while a person of the management company goes to replenish the machine with the specific type of banknotes. Further, in the case that a specific type of banknotes is sufficient in the automated teller machine, the specific type of banknotes may be depleted in the automated teller machine through a customer's withdrawal while a person of the management company goes to replenish the machine with a different type of banknotes.

Meanwhile, a conventional medium storage device is problematic in that it is difficult to selectively take out only a specific type of banknotes which need to be replenished among various types of banknotes from a transit cassette, and to selectively take out a desired number of banknotes which need to be replenished from the transit cassette. Therefore, there is a need for a medium storage device capable of replenishing a desired type of banknotes and a desired number of banknotes from a transit cassette that stores various types of banknotes, and transferring an unnecessary type of banknotes back to the transit cassette.

SUMMARY

In view of the above, the present disclosure provides a medium storage device and a method of controlling the medium storage device, which are capable of replenishing the required type and number of mediums from a transit cassette where mediums are stored and recovering mediums stored in a recycle cassette to the transit cassette.

In accordance with a first aspect of the present disclosure, there is provided a medium storage device including: a housing frame having, at a front portion, an entrance for replenishment and recovery to which a transit cassette is connectable; an identification unit serving to identify whether a medium is a normal medium or a rejection medium; a temporary holding unit configured to temporarily store a medium; a recycle cassette configured to accommodate the medium identified as the normal medium; a conveyance path configured to convey the medium between the identification unit, the temporary holding unit, and the recycle cassette; a control unit configured to control the conveyance path such that the medium replenished from the transit cassette is conveyed to the temporary holding unit, the medium transferred to the temporary holding unit is conveyed to the identification unit, and the medium identified as the normal medium in the identification unit is conveyed to the recycle cassette.

The control unit may control the conveyance such that the medium identified as the rejection medium in the identification unit is conveyed to the transit cassette.

The control unit may control the conveyance path such that the medium stored in the recycle cassette is conveyed to the identification unit and the medium identified as the normal medium in the identification unit is conveyed to the transit cassette.

The medium storage device may further include: a reject cassette configured to accommodate the rejection medium, wherein the control unit controls the conveyance path such that the medium identified as the rejection medium in the identification unit is conveyed to the reject cassette.

The conveyance path may include: an upper conveyance path configured to provide a moving path of the medium conveyed to and from the identification unit; a lower conveyance path connected to the upper conveyance path to form a closed loop together with the upper conveyance path; a first branch conveyance path providing a medium moving path between the upper conveyance path and the temporary holding unit; a second branch conveyance path providing a medium moving path between the lower conveyance path and the recycle cassette; a third branch conveyance path providing a medium moving path between the lower conveyance path and the reject cassette; a fourth branch conveyance path providing a medium moving path between the entrance for replenishment and recovery and a front-side connection point of the upper conveyance path and the lower conveyance path.

The control unit may control the fourth conveyance path, the upper conveyance path and the first conveyance path such that the medium replenished from the transit cassette is conveyed to the temporary holding unit, control the first conveyance path and the upper conveyance path such that the medium transferred to the temporary holding unit is conveyed to the identification unit, and control the upper conveyance path, the lower conveyance path and the second conveyance path such that the medium identified as the normal medium in the identification unit is conveyed to the recycle cassette.

The control unit may control the upper conveyance path, the lower conveyance path and the fourth conveyance path such that the mediums identified as the rejection medium in the identification unit is conveyed to the transit cassette.

The control unit may control the second branch conveyance path, the lower conveyance path and the upper conveyance path such that the medium stored in the recycle cassette is conveyed to the identification unit, and control the upper conveyance and the fourth conveyance path such that the medium identified as the normal medium in the identification unit is conveyed to the transit cassette.

The control unit may control the upper conveyance path and the third branch conveyance path such that the medium identified as the rejection medium in the identification unit is conveyed to the reject cassette.

In accordance with a second aspect of the present disclosure, there is provided a method of controlling a medium storage device, the method including: conveying a medium accommodated in a recycle cassette to an identification unit; identifying whether the medium conveyed to the identification unit is a normal medium or a rejection medium; recovering the medium identified as the normal medium in the identification unit through a transit cassette connected to a front portion of a housing frame; and conveying the medium identified as the rejection medium in the identification unit to a reject cassette to be accommodated therein.

According to one embodiment of the present disclosure, the recycle cassette can be replenished with the required type and number of mediums from the transit cassette in which the mediums are stored.

In addition, according to one embodiment of the present disclosure, the excessive mediums, the undesired types of mediums, and the damaged mediums can be transferred back to the transit cassette.

Further, according to one embodiment of the present disclosure, among mediums stored in the recycle cassette, the normal medium (normal banknote) can be recovered to the transit cassette, and the damaged medium (rejection banknote) can be stacked again in the reject cassette.

DETAILED DESCRIPTION

Figure 1:
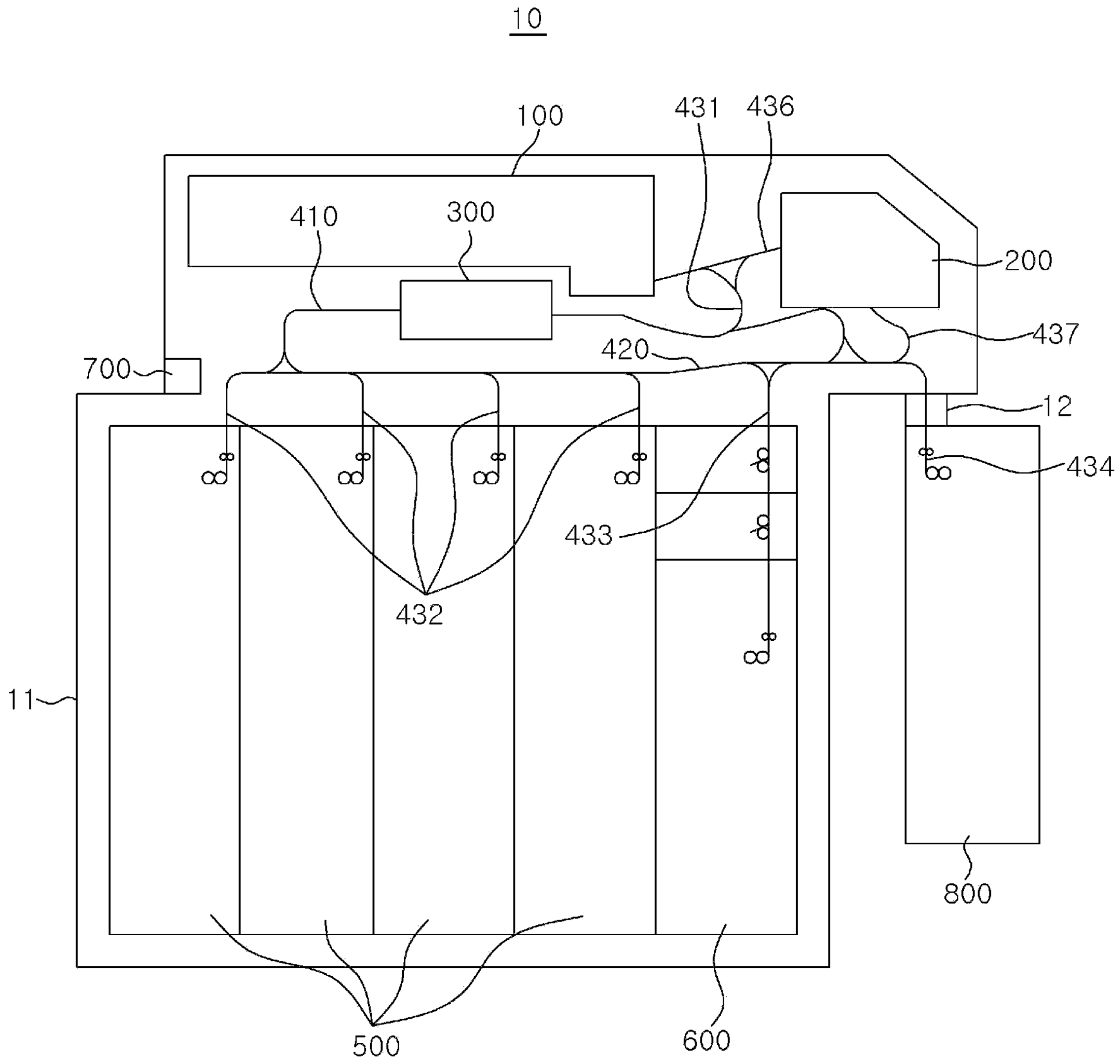
FIG. 1 is a diagram schematically illustrating the configuration of a medium storage device according to one embodiment of the present disclosure.

Hereinafter, configurations and operations of embodiments will be described in detail with reference to the accompanying drawings. The following description is one of various patentable aspects of the disclosure and may form a part of the detailed description of the disclosure.

In describing the embodiments of the present disclosure, the detailed descriptions of well-known functions or configurations will be omitted if it is determined that the detailed descriptions of well-known functions or configurations may unnecessarily make obscure the spirit of the present disclosure.

The disclosure may be variously modified and may include various embodiments. Specific embodiments will be exemplarily illustrated in the drawings and described in the detailed description of the embodiments. However, it should be understood that they are not intended to limit the disclosure to specific embodiments but rather to cover all modifications, similarities, and alternatives which are included in the spirit and scope of the disclosure.

The terms used herein, including ordinal numbers such as "first" and "second" may be used to describe, and not to limit, various components. The terms simply distinguish the components from one another.

When it is said that a component is "connected" or "linked" to another component, it should be understood that the former component may be directly connected or linked to the latter component or a third component may be interposed between the two components.

Specific terms in the present disclosure are used simply to describe specific embodiments without limiting the present disclosure. An expression used in the singular encompasses the expression of the plural, unless it has a clearly different meaning in the context.

Hereinafter, the specific configuration of a medium storage device 10 according to one embodiment of the present disclosure will be described with reference to the accompanying drawings.

As shown in FIGS. 1 to 6, with the medium storage device 10 according to one embodiment of the present disclosure, a desired number of mediums which need to be replenished may be stored in a recycle cassette 500 in the medium storage device 10 through a transit cassette 800 connected to a front portion of a housing frame 11 and the medium stored in the recycle cassette 500 may be recovered through the transit cassette 800 connected to the front portion of the housing frame 11.

The medium storage device 10 may include the housing frame 11, a temporary holding unit 100, a reception unit 200, an identification unit 300, a conveyance path, a recycle cassette 500, a reject cassette 600, and a control unit 700.

The housing frame 11 may provide a storage space for storing mediums therein. In this embodiment, the housing frame 11 is not limited to a medium storage space, and the housing frame 11 may provide the entire appearance of the medium storage device 10.

The reception unit 200 may be provided in an upper front portion of the housing frame 11. An entrance 12 for replenishment and recovery to which the transit cassette 800 are connectable may be provided at a lower side of the front portion of the housing frame 11. Here, the front of the housing frame may be understood as the side (right side of the drawing) where the reception unit 200 through which the deposit and withdrawal of mediums are made by a customer is located. The temporary holding unit 100 may be provided in an upper rear portion of the housing frame 11.

The temporary holding unit 100 may be used for temporarily storing mediums. The temporary holding unit 100 may be connected to an upper conveyance path 410 through a first branch conveyance path 431 to be described later. For example, when it is needed to replenish the medium conveyed from the transit cassette 800, the temporary holding unit 100 may receive the medium from the transit cassette 800 through a fourth branch conveyance path 434, a lower conveyance path 420, the upper conveyance path 410, and a first branch conveyance path 431, and temporarily store the medium therein. The temporary holding unit may have an entrance communicating with the first branch conveyance path 431.

The reception unit 200 may provide a space in which a medium deposited by a customer is carried, and may provide a space from which a medium that needs to be withdrawn by a customer is taken out. The reception unit 200 may include a carrying-in passage and a carrying-out passage communicating with other conveyance paths. The carrying-out passage of the reception unit 200 may be connected to the first branch conveyance path 431 through a sixth branch conveyance path 436 to be described later. When a customer deposits a medium, the reception unit 200 may transfer the deposited medium to the identification unit 300 through the sixth branch conveyance path 436, the first branch conveyance path 431, and the upper conveyance path 410. In addition, the carrying-out passage of the reception unit 200 may be connected to a front connection point of the upper conveyance path 410 and the lower conveyance path 420 through a seventh branch conveyance path 437.

The identification unit 300 may recognize mediums as either a normal medium or a rejection medium, by identifying whether the medium moving along the conveyance path is normal or abnormal. In this specification, the mediums may be divided into the normal medium and the rejection medium. The normal medium is a replenishment medium that needs to be replenished in the medium storage device 10, or an unreplenished medium that needs to be recovered from the medium storage device 10 to the transit cassette 800. The unreplenished medium means a medium which, among the mediums introduced into the medium storage device 10 from the transit cassette 800, is conveyed back to the transit cassette 800 without being accommodated in the recycling cassette 500 or the reject cassette 600. Further, the rejection medium is an abnormal medium which may be a damaged or forged medium, or a paper other than a banknote. For example, the rejection medium may be a torn banknote, a counterfeit note or a receipt. In addition, the rejection medium may include a normal medium that is not damaged in the recycle cassette 500 but is damaged while moving along the conveyance path, and a normal medium that is not damaged when it is carried into the temporary holding unit 100 but is damaged while moving along the conveyance path after carried out from temporary holding unit 100.

The recycle cassette 500 may store a medium. The medium stored in the recycle cassette 500 may be taken out through the transit cassette 800 when a recovery thereof is required, and the medium may be taken out through the reception unit 200 when a customer requests withdrawal. The medium deposited in the reception unit 200 by a customer's deposit request may be carried into the recycle cassette 500 through the identification unit 300. A plurality of recycle cassettes 500 may be provided. The mediums may be separated and stored in the plurality of recycle cassettes 500 according to the types of mediums.

A sensor (not shown) may be provided in the recycle cassette 500 to maintain a proper amount of mediums per each type in preparation for a customer's withdrawal request. The sensor may detect how much mediums is stored in the recycle cassette 500 in real time, and may inform a management company for the medium storage device 10 whether the mediums in the recycle cassette 500 are insufficient.

In the recycle cassette 500, the mediums may be accommodated up to a predetermined amount through the replenishment process of the medium through the transit cassette 800. In other words, when the quantity of mediums in the recycle cassette 500 becomes insufficient, a teller or a person of the management company can replenish the medium storage device 10 with mediums through the transit cassette 800 so that the predetermined amount of mediums are accommodated in the recycle cassette 500.

During the teller or the person of the management company moves to replenish the mediums, a part or all of the amount of mediums to be refilled may be replenished in the recycle cassette 500 of the medium storage device 10 by a customer's deposit.

When the teller or the person of the management company replenishes the mediums after the customer's deposit, the amount of mediums replenished in the transit cassette 800 becomes greater than the amount of mediums that is actually required to be refilled in the medium storage device 10 through the replenishment process.

Meanwhile, in the process of replenishing the mediums through the transit cassette 800, the entire amount of the mediums loaded in the transit cassette 800 may be introduced into the medium storage device 10. A part of the mediums introduced into the medium storage device 10 may be accommodated in the recycle cassette 500 up to the predetermined amount, and the rest of the mediums introduced into the medium storage device 10 may be returned to the transit cassette 800. The returned mediums may be included in the unreplenished medium.

The reject cassette 600 may store a damaged medium (e.g., rejection medium). In other words, in the case that the medium being conveyed from the transit cassette 800 to the recycle cassette 500 is damaged during the transfer and is identified as the rejection medium in the identification unit 300, the rejection medium may be accommodated in the reject cassette 600.

The conveyance path may convey mediums between the temporary holding unit 100, the identification unit 300, the reception unit 200, the recycle cassette 500, the reject cassette 600, and the transit cassette 800. Such a conveyance path may include a driving roller, a driven roller, a switch gate and the like to transfer the mediums. Further, the conveyance path may be driven by a motor (not shown), and may be controlled by a control unit 700. The conveyance path may include an upper conveyance path 410, a lower conveyance path 420, a first branch conveyance path 431, a second branch conveyance path 432, a third branch conveyance path 433, a fourth branch conveyance path 434, a sixth branch conveyance path 436, and a seventh branch conveyance path 437.

The upper conveyance path 410 may provide a moving path of mediums that are conveyed to or from the identification unit 300. The upper conveyance path 410 may be connected to the lower conveyance path 420 to form a closed loop. In other world, when viewed from one side (right side or left side), front and rear ends of the upper conveyance path 410 may be respectively connected to front and rear ends of the lower conveyance path to form a closed loop conveyance path. The upper conveyance path 410 may be provided above the lower conveyance path 420. The first branch conveyance path 431 may branch from the upper conveyance path 410. The upper conveyance path 410 may convey mediums, transferred from the temporary conveyance unit 100 or the reception unit 200, through the identification unit 300 to the lower conveyance path 420, or convey mediums output from the identification unit 300 to the temporary conveyance unit 100, the reception unit 200, or the lower conveyance path 420.

The lower conveyance path 420 may be connected to the upper conveyance path 410 to form a closed loop. A plurality of second branch conveyance paths 432 may branch from the lower conveyance path 420. In the lower conveyance path 420, a branch point to the reject cassette 600 and a branch point to the recycle cassette 500 may be sequentially placed in the direction toward the front of the housing frame 11 (where the reception unit 200 is located). The switch gate may be provided at each branch point of the lower conveyance path 420 to be operated under the control of the control unit 700. By adjusting the switch gates under the control of the control unit 700, the lower conveyance path 420 may convey mediums, transferred from the upper conveyance path 410, to the recycle cassette 500, or may convey mediums, transferred from the recycle cassette 500, to the upper conveyance path 410.

The first branch conveyance path 431 may branch from the upper conveyance path 410 to provide a medium moving path between the upper conveyance path 410 and the temporary holding unit 100. The first branch conveyance path 431 may branch upwardly from the upper conveyance path 410. The sixth branch conveyance path 436 may branch from the first branch conveyance path 431. The switch gate operated under the control of the control unit 700 may be provided at a branch point of the first branch conveyance path 431 from which the sixth branch conveyance path 436 branches.

The second branch conveyance paths 432 may branch from the lower conveyance path 420 to provide medium moving paths between the lower conveyance path 420 and the recycle cassettes 500. The second branch conveyance paths 432 may branch forward and downward from the lower conveyance path 420 in the direction toward the front portion of the housing frame 11.

The third branch conveyance path 433 may branch from a connection point between the upper conveyance path 410 and the lower conveyance path 420. The third branch conveyance path 433 may branch rearward and downward from the lower conveyance path in the direction toward the front of the housing frame 11. The third branch conveyance path 433 may provide a medium moving path between the upper conveyance path 410 and the reject cassette 600, or a medium moving path between the lower conveyance path 420 and the reject cassette 600, by adjusting the switch gate under the control of the control unit 700.

The fourth branch conveyance path 434 may provide a medium moving path between a front-side connection point of the upper conveyance path 410 and the lower conveyance path 420, and the entrance 12 for replenishment and recovery. For example, the fourth branch conveyance path 434 may convey a medium, transferred from the transit cassette 800, to the lower conveyance path 420, or may convey a medium, transferred from the lower conveyance 420 or the upper conveyance path 410, to the transit cassette 800.

The sixth branch conveyance path 436 may branch from the first branch conveyance path 431 to be connected to the reception unit 200. The sixth branch conveyance path 436 may provide a medium moving path between the reception unit 200 and the temporary holding unit 100, or a medium moving path between the reception unit 200 and the upper conveyance path 410, by adjusting the switch gate under the control of the control unit 700.

The seventh branch conveyance path 437 may branch from the connection point between the upper conveyance path 410 and the lower conveyance path 420 to be connected to the reception unit 200. The seventh branch conveyance path 437 may convey a medium, transferred from the reception unit 200, to the lower conveyance path 420, by adjusting the switch gate under the control of the control unit 700.

The switch gates may be provided at branch points of the upper conveyance path 410, the lower conveyance path 420, the first branch conveyance path 431, the second branch conveyance path 432, the third branch conveyance path 433, the fourth branch conveyance path 434, the sixth branch conveyance path 436, and the seventh branch conveyance path 437 to switch a medium moving path. The switch gate may change its posture through rotation to selectively determine the medium moving path under the control of the control unit 700.

The control unit 700 may control the conveyance path such that, among mediums conveyed from the transit cassette 800, the normal medium is conveyed to the recycle cassette and the rejection medium is conveyed back to the transit cassette 800. Further, the control unit 700 may control the conveyance path such that, among the mediums stored in the recycle cassette 500, the normal medium is conveyed to the transit cassette 800, and the rejection medium is conveyed to the reject cassette 600. The control unit 700 may be implemented by an operation device including a microprocessor, a measuring device such as a sensor, and a memory. Since the implementation method is obvious to those skilled in the art, a detailed description thereof will be omitted. Hereinafter, the control method of the control unit 700 will be described in detail.

Figure 2:
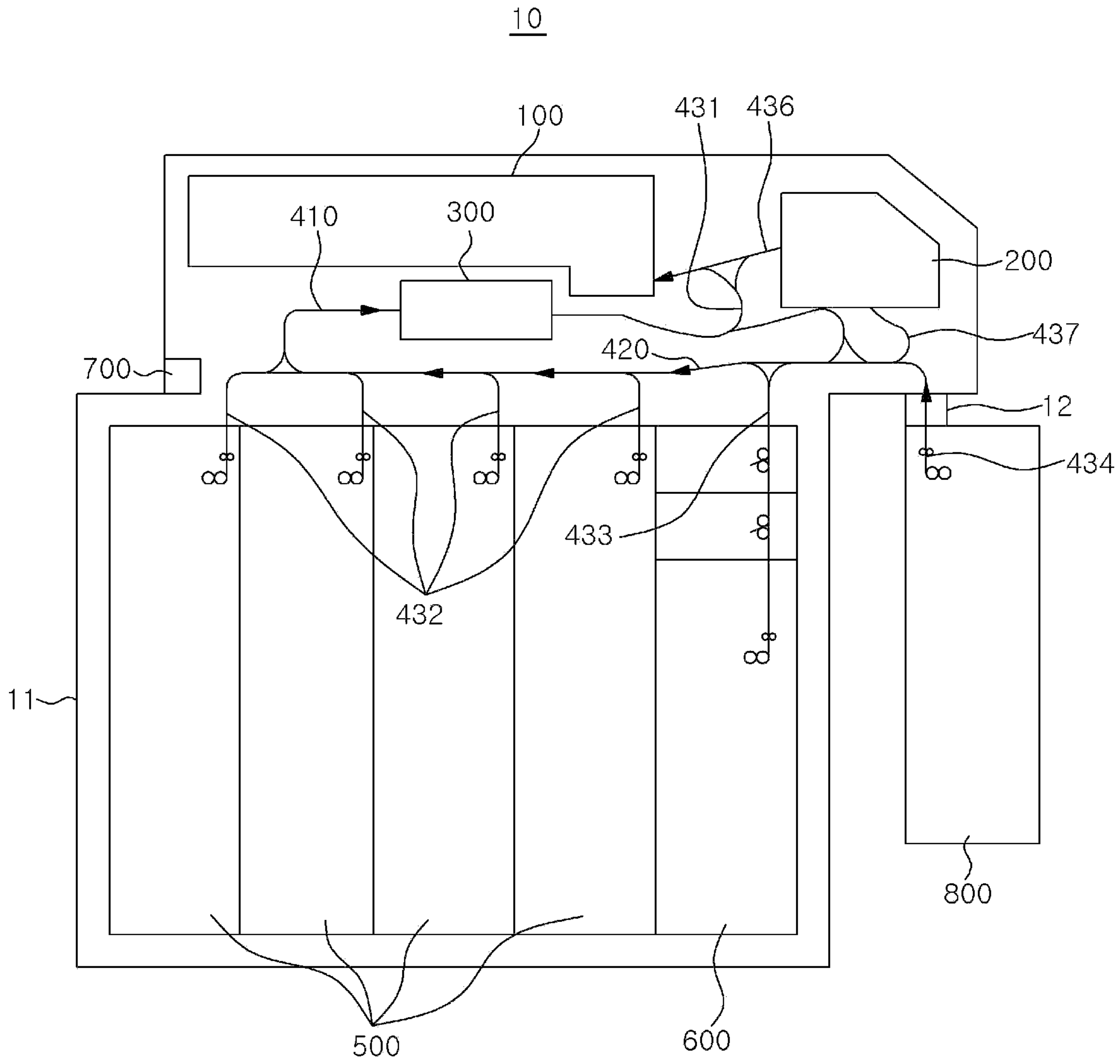
FIG. 2 is a state diagram illustrating a path along which a medium of a transit cassette is transferred through an identification unit to a temporary holding unit, in the medium storage device according to one embodiment of the present disclosure.

Specifically, referring to FIG. 2, the control unit 700 may control the fourth branch conveyance path 434, the lower conveyance path 420 and the upper conveyance path 410 such that the mediums conveyed from the transit cassette 800 are conveyed to the temporary holding unit 100 through the identification unit 300. Further, referring to FIG. 3, the control unit 700 may control the first conveyance path 431 and the upper conveyance path 410 such that the mediums temporarily stored in the temporary holding unit 100 are conveyed to the identification unit 300. Then, the control unit 700 may control the conveyance path to transfer mediums to different places depending on the types of the mediums identified in the identification unit 300.

Figure 3:
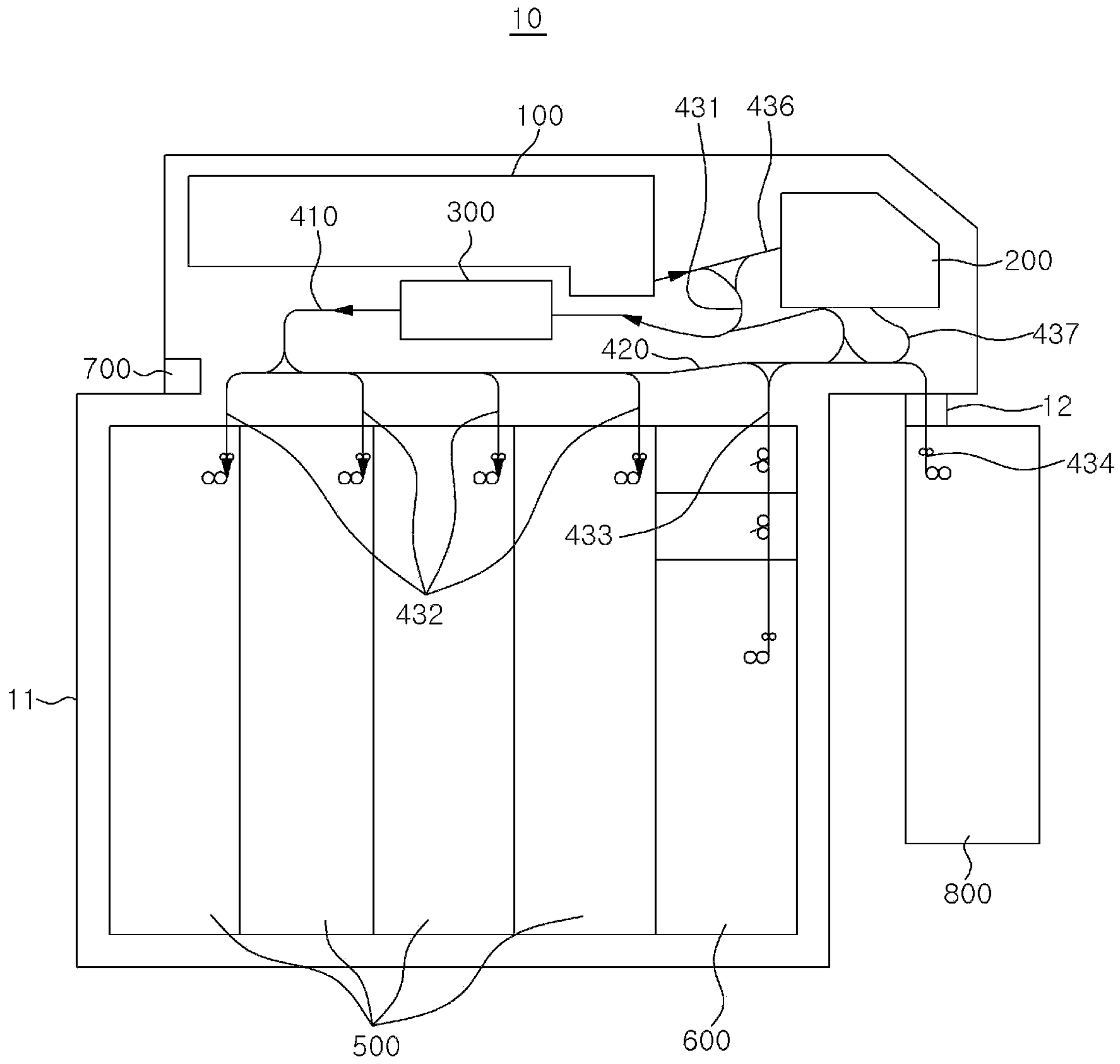
FIG. 3 is a state diagram illustrating a path along which the medium stored in the temporary holding unit in FIG. 2 is transferred to the transit cassette or a recycle cassette through the identification unit.

For example, as shown in FIG. 3, the control unit 700 may sequentially control the upper conveyance path 410, the lower conveyance path 420 and the second branch conveyance path 432 such that the normal medium identified in the identification unit 300 is conveyed to the recycle cassette 500. Further, the control unit 700 may control the upper conveyance path 410, the lower conveyance path 420 and the fourth branch conveyance path such that the rejection medium identified in the identification unit 300 is conveyed to the transit cassette 800. In other words, in the case that the medium being conveyed is damaged and is identified as the rejection medium in the identification unit 300, the control unit 700 may control the upper conveyance path 410, the lower conveyance path 420 and the fourth branch conveyance path 434 such that the rejection medium is transferred to the transit cassette 800.

Figure 4:
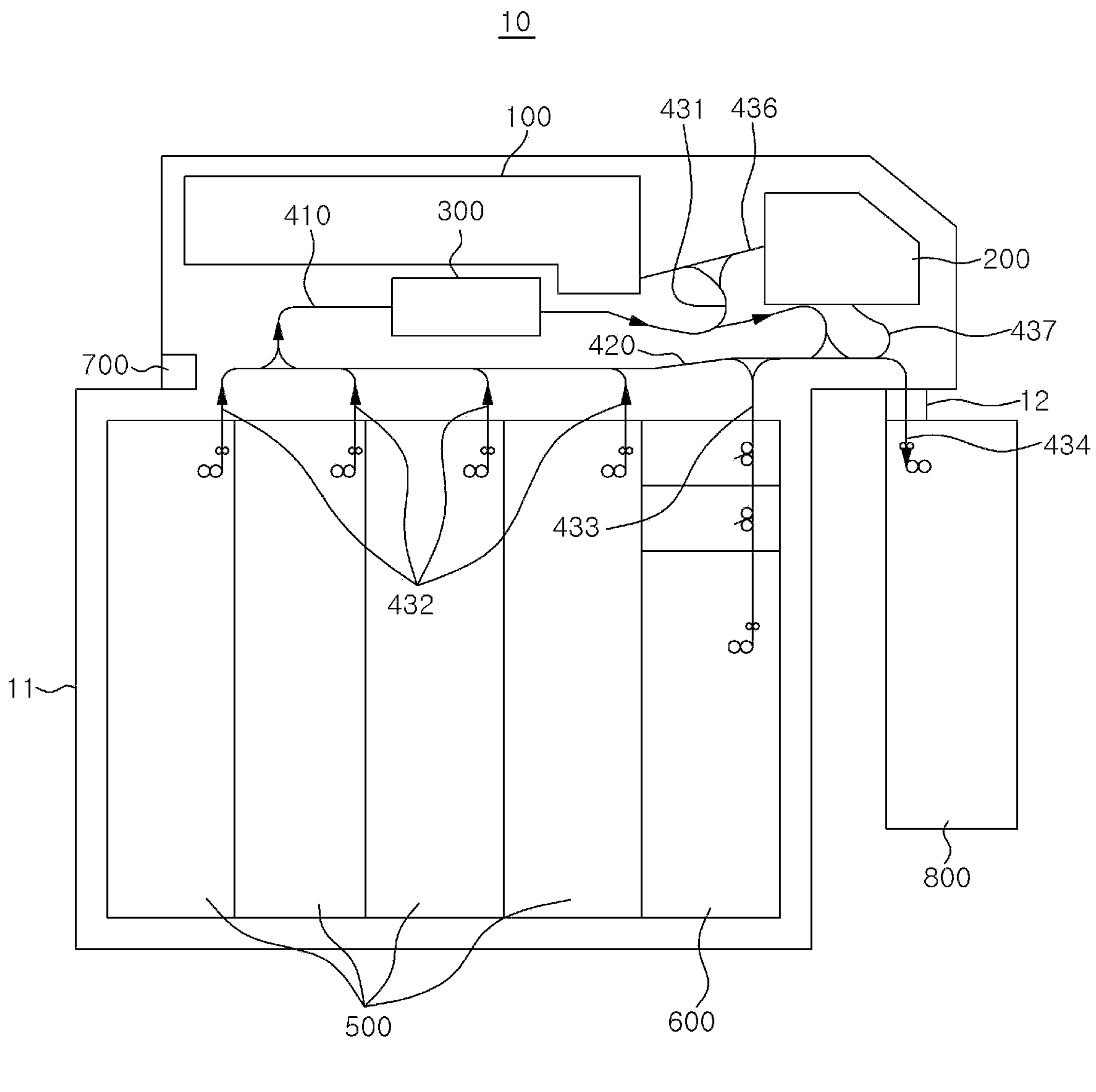
FIG. 4 is a state diagram illustrating a path along which a medium of the recycle cassette is transferred through the identification unit to the transit cassette, in the medium storage device according to one embodiment of the present disclosure.

Referring to FIG. 4, the control unit 700 may control the second branch conveyance paths 432, the lower conveyance path 420 and the upper conveyance path 410 to convey mediums, stored in the recycle cassette 500, to the identification unit 300. Then, the control unit 700 may control the conveyance path to convey mediums to different places depending on the types of the mediums identified in the identification unit 300.

Figure 5:
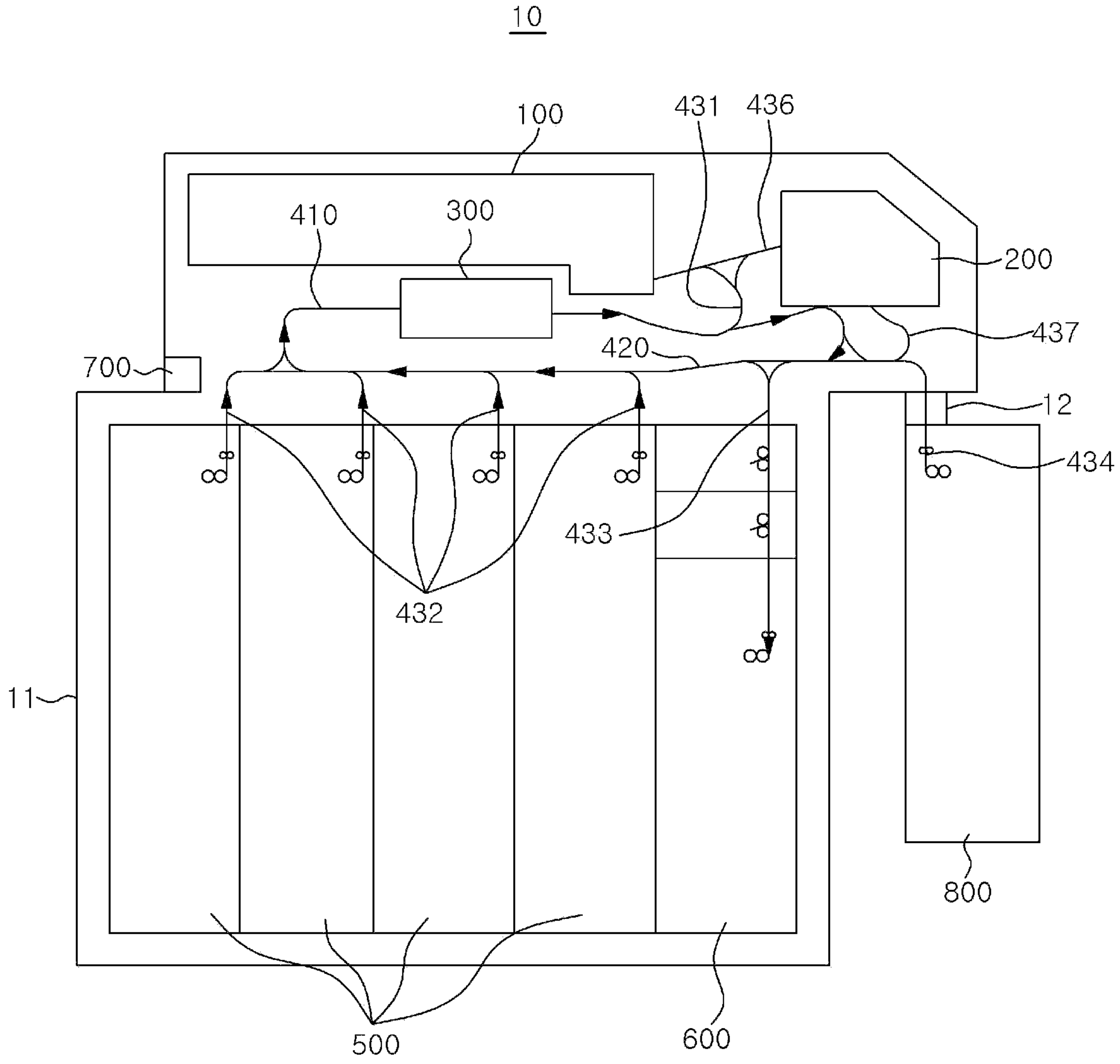
FIG. 5 is a state diagram illustrating a path along which a medium of the recycle cassette is transferred through the identification unit to a reject cassette, in the medium storage device according to one embodiment of the present disclosure.

By way of example, as shown in FIG. 4, the control unit 700 may control the upper conveyance path 410 and the fourth branch conveyance path 434 such that the normal medium identified in the identification unit 300 is conveyed to the transit cassette 800. Further, as shown in FIG. 5, the control unit 700 may sequentially control the upper conveyance path 410, the lower conveyance path 420, and the third branch conveyance path such that the rejection medium identified in the identification unit 300 is conveyed to the reject cassette 600. For example, in the case that the medium being conveyed is damaged and is identified as the rejection medium in the identification unit 300, the control unit 700 may control the upper conveyance path 410, the lower conveyance path 420, and the third branch conveyance path 433 to convey the rejection medium to the reject cassette 600.

Figure 6:
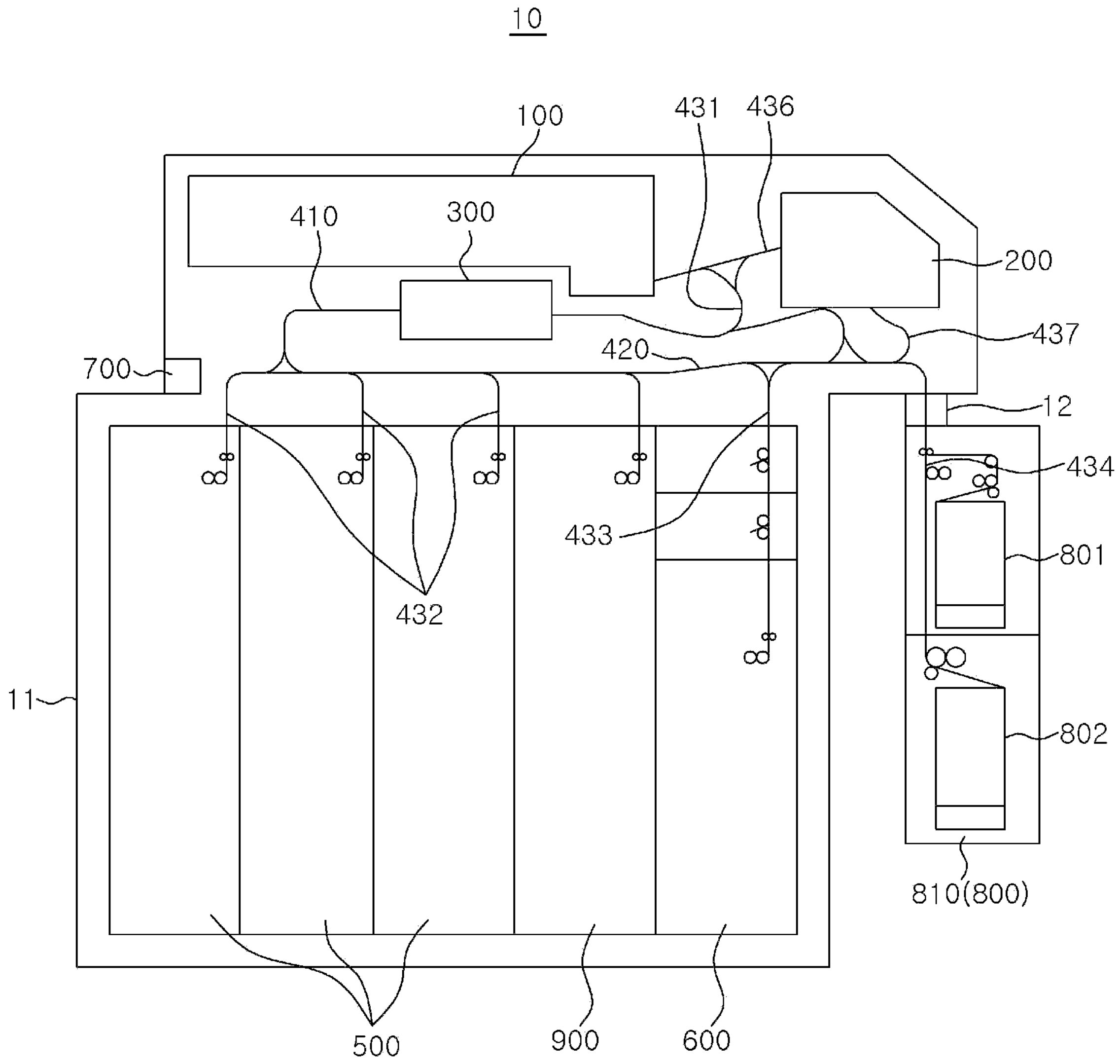
FIG. 6 is a diagram illustrating a medium storage device in which a deposit cassette is installed according to a modification of one embodiment of the present disclosure.

Referring to FIG. 6, according to a modification of one embodiment of the present disclosure, the medium storage device 10 may include a housing frame 11, a temporary holding unit 100, a reception unit 200, an identification unit 300, a conveyance path, a recycle cassette 500, a reject cassette 600, a control unit 700, and a deposit cassette 900. Here, since the configurations of the components other than the deposit cassette 900 correspond to the configurations described in the above-described embodiment, a detailed description thereof will be omitted.

The deposit cassette 900 may store a medium deposited through the reception unit 200. For example, the medium deposited in the reception unit 200 by a customer's deposit request may be conveyed into the deposit cassette 900 through the identification unit 300. The deposit cassette 900 may be provided with a sensor (not shown) for sensing an appropriate amount of mediums deposited by customers. The sensor may sense in real time whether an appropriate amount of mediums are stored in the deposit cassette 900, and may inform a management company for the medium storage device 10 whether it is necessary to replenish the deposit cassette 900 with mediums or recover mediums from the deposit cassette 900.

In particular, when replenishing the medium through the transit cassette 800, the control unit 700 may control the conveyance path such that a medium (replenishment medium) in the transit cassette 800 is conveyed to the identification unit 300. In the case that the medium conveyed from the transit cassette 800 is identified as the unreplenished medium in the identification unit 300, the control unit 700 may control the conveyance path to convey the medium identified as the unreplenished medium to the deposit cassette 900.

Hereinafter, in case of replenishing mediums through the transit cassette 800, a method for controlling the medium storage device according to one embodiment of the present disclosure will be described.

Figure 7:
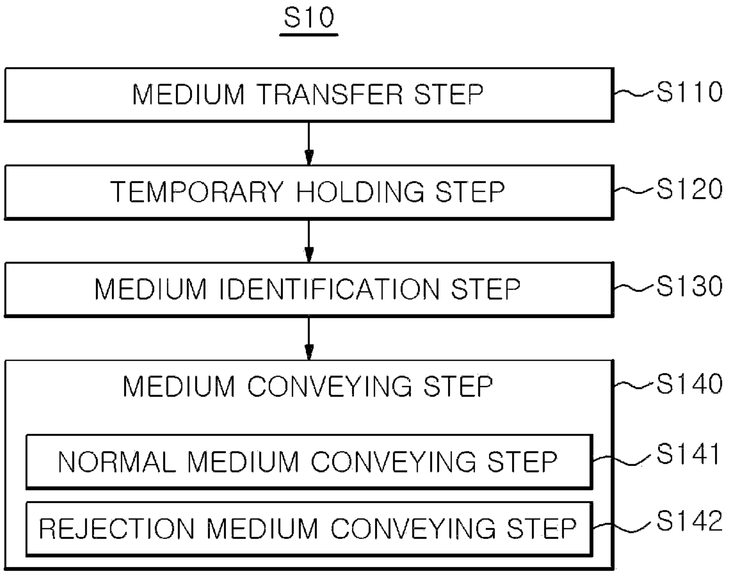
FIG. 7 is a flowchart schematically illustrating a method of controlling the medium storage device in case of replenishing the medium through the transit cassette according to one embodiment of the present disclosure.

Referring to FIGS. 2 and 3, a medium storage device control method S10 may provide a method of controlling the medium storage device 10 to convey and replenish the medium, conveyed from the transit cassette 800, to the recycle cassette 500. As shown in FIG. 7, the medium storage device controlling method S10 may include a medium transfer step S110, a temporary holding step S120, a medium identification step S130, and a medium conveying step S140.

In the medium transfer step S110, a medium may be conveyed from the transit cassette 800. In the medium transfer step S110, the transit cassette 800 may be connected to the entrance 12 for replenishment and recovery at the front portion of the housing frame 11 such that the medium in the transit cassette 800 can be carried into the housing frame 11. In addition, in the medium transfer step S110, the medium received from the transit cassette 800 is conveyed to the temporary holding unit 100. In the medium transfer step S110, the medium in the transit cassette 800 may be conveyed to the temporary holding unit 100 through the fourth branch conveyance path 434, the upper conveyance path 410, the lower conveyance path 420, and the first branch conveyance path 431.

In the temporary holding step S120, the medium may be temporarily stored in the temporary holding unit 100. In the temporary holding step S120, the medium in the transit cassette 800 may be conveyed through the identification unit 300 to the temporary holding unit 100 to be stored therein.

In the medium identification step S130, the medium stored in the temporary holding unit 100 may be identified and recognized through the identification unit 300 as either the normal medium or the rejection medium. The medium identified as the normal medium in the medium identification step S130 may be conveyed to the recycle cassette 500. The medium identified as the rejection medium in the identification step S130 may be conveyed to the reject cassette 600.

In the medium conveying step S140, the medium identified through the identification unit 300 may be conveyed to any one of the recycle cassette 500 and the reject cassette 600. The medium conveying step S140 may include a normal medium conveying step S141 and a reject medium conveying step S142. In the normal medium conveying step S141, the medium identified as the normal medium in the identification unit 300 may be conveyed to the recycle cassette 500 through the upper conveyance path 410, the lower conveyance path 420, and the second branch conveyance path 432. In the reject medium conveying step S142, the medium identified as the rejection medium in the identification unit 300 may be conveyed to the reject cassette 600 through the upper transfer path 410, the lower transfer path 420, and the third branch transfer path 433.

Hereinafter, in case of recovering a medium through the transit cassette 800, a method of controlling the medium storage device according to one embodiment of the present disclosure will be described.

Figure 8:
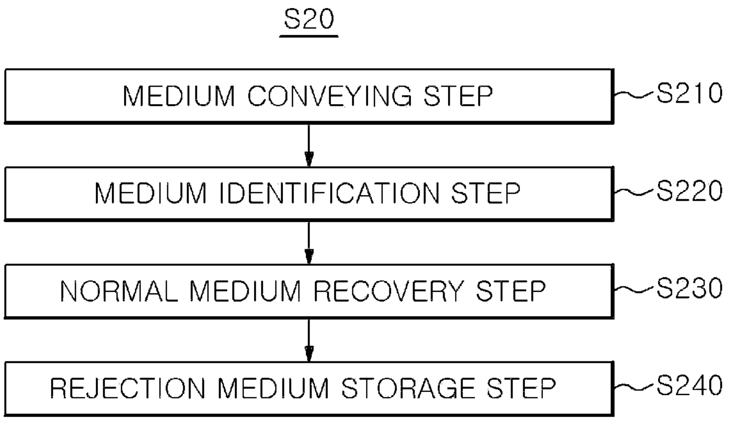
FIG. 8 is a flowchart schematically illustrating a method of controlling the medium storage device in case of recovering the medium through the transit cassette according to one embodiment of the present disclosure.

Referring to FIGS. 4 and 5, a medium storage device control method may provide a method of controlling the media storage device 10 such that the medium stored in the recycle cassette 500 is transferred and recovered to the transit cassette 800. As shown in FIG. 8, the medium storage device control method S20 may include a medium conveying step S210, a medium identification step S220, a rejection medium storage step S230, and a normal medium recovery step S240.

In the medium conveying step S210, the medium stored in the recycle cassette 500 may be conveyed to the identification unit 300. In the medium conveying step S210, the medium stored in the recycle cassette 500 may be conveyed to the identification unit 300 through the second branch transfer path 432, the lower transfer path 420, and the upper transfer path 410.

In the medium identification step S220, the medium conveyed to the identification unit 300 may be identified and recognized as either the normal medium or the rejection medium. In the medium identification step S220, the medium identified as the normal medium may be transferred to the transit cassette 800. In the medium identification step S220, the medium identified as the rejection medium may be transferred to the reject cassette 600.

Referring to FIG. 4, in the normal medium recovery step S230, the medium identified as the normal medium in the identification unit 300 may be recovered through the transit cassette 800 connected to the front portion of the housing frame 11. In the normal medium recovery step S230, the medium identified as the normal medium in the identification unit may be conveyed to the transit cassette 800 through the upper conveyance path 410 and the fourth branch conveyance path 434.

Referring to FIG. 5, in the rejection medium storage step S240, the medium identified as the rejection medium in the identification unit 300 may be conveyed to the reject cassette to be stored therein. In the rejection medium storage step S240, the medium identified as the rejection medium in the identification unit 300 may be conveyed to the reject cassette through the upper conveyance path 410 and the third branch conveyance path 433.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A medium storage device comprising:

an identification unit serving to identify whether a medium is a normal medium or a rejection medium;

a temporary holding unit configured to temporarily store a medium;

a recycle cassette configured to accommodate the medium identified as the normal medium;

a conveyance path configured to convey the medium between the identification unit, the temporary holding unit, and the recycle cassette;

a control unit configured to control the conveyance path such that the medium replenished from a transit cassette is conveyed to the temporary holding unit, the medium transferred to the temporary holding unit is conveyed to the identification unit, and the medium identified as the normal medium in the identification unit is conveyed to the recycle cassette; and a housing frame accommodating the identification unit, the temporary holding unit, the recycle cassette, the conveyance path, and the control unit, wherein an entrance, to which the transit cassette is connectable for replenishing and recovering the medium, protrudes from a front portion of the housing frame.

2. The medium storage device of claim 1, wherein the control unit controls the conveyance path such that the medium identified as the rejection medium in the identification unit is conveyed to the transit cassette.

3. The medium storage device of claim 1, wherein the control unit controls the conveyance path such that the medium stored in the recycle cassette is conveyed to the identification unit and the medium identified as the normal medium in the identification unit is conveyed to the transit cassette.

4. The medium storage device of claim 3, further comprising:

a reject cassette configured to accommodate the rejection medium, wherein the control unit controls the conveyance path such that the medium identified as the rejection medium in the identification unit is conveyed to the reject cassette.

5. The medium storage device of claim 4, wherein the conveyance path comprises:

an upper conveyance path configured to provide a moving path of the medium conveyed to and from the identification unit;

a lower conveyance path connected to the upper conveyance path to form a closed loop together with the upper conveyance path;

a first branch conveyance path providing a medium moving path between the upper conveyance path and the temporary holding unit;

a second branch conveyance path providing a medium moving path between the lower conveyance path and the recycle cassette;

a third branch conveyance path providing a medium moving path between the lower conveyance path and the reject cassette;

a fourth branch conveyance path providing a medium moving path between the entrance for replenishment and recovery and a front-side connection point of the upper conveyance path and the lower conveyance path.

6. The medium storage device of claim 5, wherein the control unit controls the fourth conveyance path, the upper conveyance path and the first conveyance path such that the medium replenished from the transit cassette is conveyed to the temporary holding unit, controls the first conveyance path and the upper conveyance path such that the medium transferred to the temporary holding unit is conveyed to the identification unit, and controls the upper conveyance path, the lower conveyance path and the second conveyance path such that the medium identified as the normal medium in the identification unit is conveyed to the recycle cassette.

7. The medium storage device of claim 6, wherein the control unit controls the upper conveyance path, the lower conveyance path and the fourth conveyance path such that the mediums identified as the rejection medium in the identification unit is conveyed to the transit cassette.

8. The medium storage device of claim 5, wherein the control unit controls the second branch conveyance path, the lower conveyance path and the upper conveyance path such that the medium stored in the recycle cassette is conveyed to the identification unit, and controls the upper conveyance and the fourth conveyance path such that the medium identified as the normal medium in the identification unit is conveyed to the transit cassette.

9. The medium storage device of claim 8, wherein the control unit controls the upper conveyance path and the third branch conveyance path such that the medium identified as the rejection medium in the identification unit is conveyed to the reject cassette.

10. A method of controlling the medium storage device of claim 3, the method comprising:

conveying a medium accommodated in the recycle cassette to the identification unit;

identifying whether the medium conveyed to the identification unit is a normal medium or a rejection medium;

recovering the medium identified as the normal medium in the identification unit through the transit cassette connected to the entrance; and conveying the medium identified as the rejection medium in the identification unit to the reject cassette to be accommodated therein.

* * * * *